United States Patent
Cricchio et al.

[11] 3,862,934
[45] Jan. 28, 1975

[54] 3-HYDRAZONOMETHYL RIFAMYCINS

[75] Inventors: Renato Cricchio, Varese; Giancarlo Lancini, Pavia, both of Italy

[73] Assignee: Gruppo Lepitit S.p.A., Milano, Italy

[22] Filed: Feb. 16, 1973

[21] Appl. No.: 333,111

[30] Foreign Application Priority Data
Feb. 23, 1972  Italy.................................. 20911/72

[52] U.S. Cl............. 260/239.3 P, 424/244, 424/278
[51] Int. Cl........................ C07d 99/02, C07d 99/04
[58] Field of Search.............................. 260/239.3 P

[56] References Cited
UNITED STATES PATENTS
3,342,810  9/1967  Maggi et al.................... 260/239.3 P Primary Examiner—Henry R. Jiles
Assistant Examiner—Robert T. Bond
Attorney, Agent, or Firm—Theodore Post; C. Kenneth Bjork

[57] ABSTRACT

3-Hydrazonomethyl rifamycin compounds of the following formula and their 25-desacetyl and 16, 17; 18, 19; 28, 29-hexahydro derivatives:

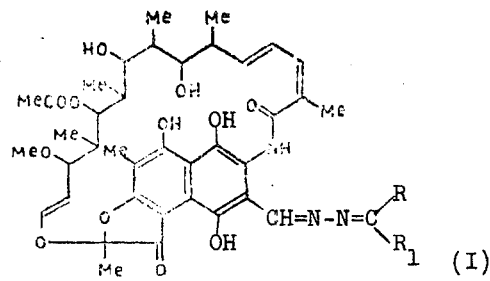

wherein R is hydrogen or phenyl, $R_1$ is phenyl or p-carboxyphenyl, and R and $R_1$ taken together with the adjacent carbon atom may represent a 5 to 10 carbon atom cycloalkylidene group. The compounds are prepared by reacting 3-formylrifamycin SV or its 25-desacetyl or hexahydro derivative with a hydrazine of the formula

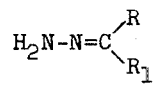

wherein R and $R_1$ have the meaning given above. The compounds have antimicrobial and DNA-polymerase inhibitory activity.

5 Claims, No Drawings

3-HYDRAZONOMETHYL RIFAMYCINS

SUMMARY OF THE INVENTION

The present invention concerns 3-hydrazonomethyl rifamycins of following formula (I) and their 25-desacetyl and 16, 17; 18, 19; 28, 29-hexahydro derivatives

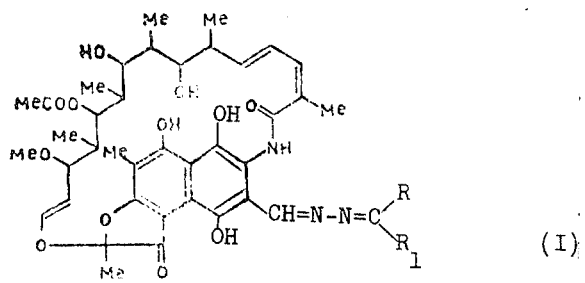

(I)

wherein Me represents methyl, R represents hydrogen or phenyl, $R_1$ represents phenyl or p-carboxyphenyl, and R and $R_1$ taken together with the adjacent carbon atom may represent a cycloalkylidene group derived from a 5 to 10 carbon atom cycloaliphatic hydrocarbon. The terms "cycloalkyl" and "cycloalkylidene" as used in this specification and in the claims also comprise groups derived from aliphatic spiranes and cycloaliphatic rings which contain one or more double bonds and may carry one or more substituents selected from hydroxy, carboxy, amino and di-lower alkylamino, lower alkyl, hydroxy-lower alkyl, amino-lower alkyl, lower alkylamino-lower alkyl, di-lower alkylamino-lower alkyl. The term "lower alkyl" designates a 1 to 4carbon atom alkyl group, i.e., from 1, to 2, to 3, to 4 carbon atoms, such as, for example, methyl, ethyl, propyl or butyl.

The compounds are prepared by reacting 3-formylrifamycin or its 25-desacetyl or hexahydro derivative with a hydrazine of the formula

(II)

wherein R and $R_1$ have the same meaning as above.

The reaction is advantageously carried out at room temperature by adding to a solution of the starting 3-formylrifamycin compound in an inert organic solvent a substantially equimolar amount of a hydrazine of formula (II). The reaction is generally completed in a period of time ranging from about 10 minutes to about 4 to 5 hours. Heating up to reflux temperature of the reaction mixture is advantageous in cases where the reaction rate is very low. The 3-hydrazonomethyl rifamycin is recovered by evaporating the reaction solvent and purifying the crude product by crystallization and-/or column chromatography.

The starting hydrazine compounds are prepared by known procedures which comprise heating in an inert organic solvent a carbonyl derivative of the formula

wherein R and $R_1$ have the same meaning as above, with an equimolecular amount of hydrazine. By selecting the appropriate carbonyl compounds, it is possible to prepare a broad series of hydrazines of formula (II) which in turn may be readily reacted with the indicated 3-formylrifamycin derivatives to obtain the corresponding end compounds of formula (I). Thus, for example, the following carbonyl compounds are converted to the corresponding hydrazine and then to compounds of formula (I) by the indicated procedures.

CARBONYL COMPOUNDS OF THE FORMULA

Cyclopentanone
Cyclohexanone
(±) Menthone
(−) Menthone
(±) Camphor
(+) Camphor
Carvone
Pulegone
Isopulegone
Cyclohexan-4-one-1-carboxylic acid
2-Butyl-3-methyl-2-cyclohexenone
2-(Dimethylaminoethyl)cyclohexanone
Cyclohexan-3-one-1-acetic acid
Cycloheptanone
4,4-Dimethylcycloheptanone
3,5,5-Trimethylcycloheptanone
Cyclooctan-2-one-1-propionic acid
Cyclodecanone
Spiro [5,5]undecan-1-one
Spiro [6,7]tetradecan-8-one The compounds of this invention are colored solids which may be crystallized from common organic solvents such as, for example, the lower alkanols, ethyl acetate, dioxane, tetrahydrofuran, benzene and liquid chlorinated hydrocarbons. Their solubility in an organic solvent obviously depends on the type and the bulkiness of the moieties R and $R_1$. When acidic functions are present, the compounds as their alkali metal salts are soluble in water.

The inventive compounds have good antibacterial activity against gram-positive and gram-negative bacteria. In particular, the new class of compounds shows a remarkable activity against *S. aureus* strains with which the minimum inhibitory concentration ranges from about 0.001 to about 0.05 µg/ml. The compounds are also active at concentrations varying from 1 to 50 µg/ml. against *S. aureus* strains which are resistant to other known rifamycins. The toxicity of the new compounds is very low.

Another very important property of the inventive compounds is their inhibitory activity of DNA-polymerases which are characteristic of human leukemic blood lymphoblasts and against typical nucleotidyl transferases (polymerases) of viruses not utilized by the normal cell. It is known from studies on members of representative virus groups that they either carry or induce in the host cells polymerases as an essential part of their replication. Thus, there are viruses such as picornaviruses or polioviruses which induce RNA-dependent RNA-polymerase while other groups such as leukemia-sarcoma viruses carry an RNA-dependent DNA-polymerase. The presence and the very important role of the RNA-dependent DNA-polymerase reverse transcriptase in oncogenic RNA viruses has been discovered by D. Baltimore, Nature, 226, 1209 (1970) and by H. M. Temin et al., Nature, 226, 1211 (1970). Recent discovery of RNA-dependent DNA-polymerase enzyme in RNA tumor viruses of animal species has also been confirmed by others, for example, Green et al., Mechanism of Carcinogenesis by RNA Tumor Viruses, I. An RNA-Dependent DNA-Polymerase in Murine Sarcoma Viruses, Proc. Nat. Acad. Sci. U.S.A. 67: 385-393, 1970. Spiegelman et al.: Characterization of the Products of RNA-directed DNA polymerases in Oncogenic RNA Viruses, Nature, London, 227: 563, 1970. Hatanaka et al.: DNA Polymerase Activity Associated with RNA Tumor Viruses, Proc. Nat. Acad. Sci. U.S.A. 67: 143, 1970. Scolnick et al.: DNA Synthesis by RNA-Containing Tumor Viruses, Proc. Nat. Acad. Sci. U.S.A. 67: 1034, 1970. RNA virus implication in some tumors has been supported also by other facts: reverse transcriptase has been found to be present in particles from human milk obtained from women with a familial history of breast cancer and from inbred population. (Schlom et al., Nature, 231, 97, 1971). While Priori et al. (Nature New Biology, 232, 16, 1971) isolated a virus named ESP-1 containing reverse transcriptase from cells from the pleural fluid of a child with lymphoma and have succesfully grown it in tissue cultures.

The presence in human breast cancer of RNA homologous to mouse mammary tumor virus RNA has been demonstrated through molecular hybridation experiments by R. Axel et al. (Nature, 235, 32, 1972). The possibility of a human breast cancer virus was also supported by electron microscopy of human milk (N H. Sarkar et al., Nature, 236, 103, 1972). RNA-directed DNA-polymerase activity and virus-like particles have been isolated also from human rhabdomyosarcoma cells (McAllister et al., Nature New Biol., 235, 3, 1972). At present there are no very effective drugs for treating viral diseases, since viruses and cells have common metabolic requirements and pathways. The most promising approach to viral chemotherapy clearly is the design of suitable chemicals which combine specifically with viral or virus-transformed cell polymerase but not with host cell polymerases controlling the expression of genetic information of viruses. Specific inhibitors of the viral or virus-transformed cell enzymes and, in particular, inhibitors of polymerases of RNA tumor viruses may have an important role in providing drugs for leukemia and other cancer therapy. The inhibiting activity of the inventive compounds has been tested on RNA-dependent DNA polymerase of murine sarcoma virus (endogenous) and DNA-dependent DNA polymerase activity of purified enzymes. The inhibition was tested according to the methods described by C. Gurgo et al., Nature New Biology, 229, 111, 1971.

The effect of different concentrations of drugs on polymerase activity was determined by following $^3$H-dTTP (tritiated thymine deoxyriboside triphosphate) incorporation into the insoluble fraction. A typical example of the experimental procedures is the following.

1. Isolation of Virus and Purification of Viral Polymerase

Virus was isolated and purified from murine sarcoma virus (Moloney isolate) transformed rat cells (78A1 cells and murine sarcoma virus (Harvey isolate) transformed mouse cells (MEH cells), as previously described (Green et al., Proc. Nat. Acad. Sci. U.S.A. 67, 385, 1970; Rokutanda et al., Nature, 227, 1026, 1970). The virion polymerase was purified 20-40 fold by incubation of purified virus with 0.5% NP-40 (nonident P-40) in 0.1 M NaCl, 0.01 M Tris buffer (pH 7.6), 0.001 M EDTA for 5 minutes at room temperature and zonal centrifugation in 15-30% sucrose gradients in 10 mM sodium phosphate buffer (pH 7.4), 2.5 mM MgCl$_2$, 10 mM dithiothreitol, and 5% glycerol for 24 hours at 38,000 rpm in a Spinco SW 41 rotor. The peak fractions of enzyme activity (13-17) of twenty-two fractions collected were pooled and stored at −70°C. in 30% glycerol.

DNA Polymerase Assay

Enzyme incubations were performed for 1 hour at 37°C. in 100 ml. of reaction mixture containing 40 mM Tris buffer (pH 8.0), 5 mM dithiothreitol, 30 mM NaCl, 2.5 mM MgCl$_2$, 0.1 mM dATP, dGTP, dCTP and 10 $\mu$Ci of $^3$H-dTTP (12-18 Ci/mmole) as described by Green et al. in Proc. Nat. Acad. Sci. U.S.A. 67, 385, 1970. The reaction was terminated by the addition of 150 $\mu$l of 1N perchloric acid. Calf thymus DNA (100 $\mu$g) was added as carrier; the radioactive DNA product was processed as described in the two papers mentioned above. Endogenous RNA-dependent DNA-polymerase activity was measured after the addition of 0.01% NP-40 to purified virus at the time of assay. The DNA-polymerase activity of purified viral polymerase was measured with 2 $\mu$g of poly d(A-T) as template and no Np-40.

Test For Inhibition by 3-Hydrazonomethyl-Rifamycin Derivatives

The 3-hydrazonomethyl-rifamycin derivatives of this invention were dissolved in dimethylsulfoxide (DMSO) at a concentration of 5 mg/ml. and stored at 4°C. Inhibition of the endogenous RNA-dependent DNA-polymerase activity was tested by adding 2 $\mu$l of derivative appropriately diluted in DMSO, or 2 $\mu$l of DMSO (control) to the assay mixture prior to addition to disrupted virus which contained 15 to 30 $\mu$g of viral protein. Enzyme incubation was performed for 60 minutes at 37°C. Inhibition of purified enzyme was tested by pre-incubation of 2 $\mu$l of derivative or DMSO with 30 $\mu$l of enzyme (1 to 2 $\mu$g of protein) for 10 minutes at 37°C.; then 70 $\mu$l of substrate mixture was added and the mixture further incubated and processed as described above.

In representative tests, the inventive compounds at a concentration of 2-100 $\mu$g/ml or less reduced the incorporation of H$^3$-dTTP to less than 10 percent of that found in the control tests, clearly demonstrating inhibition of mechanism of carcinogenesis by RNA tumor viruses, according to the most recent biochemical points of view.

The inhibiting effect of reverse transcriptases has been confirmed also by tests on polymerase from murine leukemia virus. Murine leukemia virus RNA-polymerase was prepared from Triton × 100 disrupted virions, as described by Gallo et al. in Nature New Biology, 232, 141, (1971). Virus of both Rauscher and Moloney types were previously purified by banding in the 1.16 g/ml. region of a sucrose density gradient after initial low speed centrifugation to remove cellular debris and cushioning on 60% sucrose through 20% sucrose. Final concentration of virus preparation was at $10^{11}$ particles/ml. As template, endogenous 70S RNA was used. Concentrations of 50 μg/ml. or less of the inventive compounds were found to be effective in inhibiting the enzyme. Similar results were found by using tumor cell polymerases of human origin. In this case the inhibiting activity was also studied on normal cell polymerases to characterize a selective effect. Representative rifamycin derivatives of formula (I) have been evaluated for their effects on two purified DNA polymerases isolated from (1) human normal (PHA stimulated) blood lymphocytes, (2) a lymphoblast cell line (derived from a normal donor) and (3) human leukemic blood lymphoblast. Synthetic and/or native templates were used.

A typical example of the experimental procedure is the following:

Human Blood Lymphoblasts

Leukemic lymphoblasts were isolated from the peripheral blood of patients with acute lymphocytic leukemic (ALL) by leukophoresis. The cells were washed and erythrocytes removed by hypotonic lysis. Normal lymphocytes were obtained from the peripheral blood of healthy donors after removal of granulocytes by nylon column chromatography. They were stimulated with phyto hemagglotinin (PHA) for 72 hours as described before (Gallo et. al., Nature, 228, 927, 1970; Gallo et al., Science, 165, 400, 1968) in order to maximize DNA polymerase activity. However, because of logistic problems in obtaining sufficient amounts of these cells, a human "normal" tissue culture cell line (1788) was used to supply less purified DNA-polymerases for some of the initial survey studies. Compounds of interest were then studied in more detail with the more purified enzymes from the normal and leukemic blood lymphocytes. These tissue culture cells were obtained from Associated Biodemic Systems, Inc.

DNA-Polymerase Preparations

Cellular DNA-polymerases were extracted and purified from normal blood (PHA stimulated) lymphocytes, and leukemic blood lymphocytes and 1788 lymphoid cells by homogenization in hypotonic buffer followed by Triton X 100 and/or high salt extraction of the extralysosomal pellet. After differential centrifugation, cellular extracts were further purified by DEAE cellulose, phosphocellulose, and Sephadex G 200 column chromatography.

DNA-Polymerase Assays

DNA-polymerase assays were carried out in a final volume of 100 μl. The assay mixture contained Tris-HCl buffer, pH 8.3, 50 mM; MgAc, 6.0 mM; dithiothreitol, 8.0 mM; NaCl, 60 mM. Adjustment of pH was carried out after addition of inhibitors which were previously dissolved in DMSO. The final concentration of DMSO was 0.5% and all control samples included this amount of DMSO. An enzyme concentration that catalyzes an incorporation of approximately 1.0 μmole/hr. was used in the assay. The enzyme was in most cases preincubated for 5 minutes with the inhibitor. The reaction was then initiated by the addition of template, either synthetic DNA (poly d (AT) Miles Lab.) or DNA.RNA hybrid (oligo dT.poly rA), at 5 μg/ml. or native templates: activated salmon sperm DNA at 50 μg/ml., and endogenous 70S viral RNA; 10 μCi of ($^3$H-methyl)-TTP (New England Nuclear, 18.6 mCi/μmole, lyophilized and redissolved in 0.01 M HCl just prior to usage) and dATP ($8 \times 10^{-5}$M, with synthetic template) or all three deoxynucleoside triphosphates ($8 \times 10^{-5}$M with RNA or DNA templated reactions). In some experiments, there was no preincubation of enzyme with inhibitor.

In these cases, reactions were initiated by adding enzyme to the complete reaction mixture which included the inhibitor. Samples were withdrawn at the start of incubation and after 30 minutes and terminated by the addition of 2 ml. of 0.08 M sodium pyrophosphate, and precipitated in 12.5% cold trichloroacetic acid (TCA) with yeast RNA (400 μg) as carrier. The products were collected on a Millipore brand filter, washed extensively with 5% trichloroacetic acid (TCA) and 1 ml. of DMSO-ethanol-0.1 M NaCl mixture (0.5:70:29.5), dried and counted in 2 ml. of $BBS_3$(Beckman) and 10 ml. of liquifluor (New England Nuclear) in a Packard liquid scintillation counter. Concentrations of the inventive compounds varying from 5 to 20 μg/ml. were found to provoke a 50% inhibition of leukemic polymerase with a synthetic DNA template. Reactions templated by a synthetic RNA template (poly rA.rU) were even more susceptible. Representative experiments carried out with native template on normal and tumor cell polymerases showed a higher susceptibility of the tumor enzymes to the tested compounds. Other biological characteristics displayed by the new rifamycin derivatives include inhibition of focus formation on mouse, rat and human cells by the Moloney and Kirsten strain of murine sarcoma virus; selective inhibition of virus production by already transformed mouse and human cells; detection of revertant cells using the murine sarcoma virus transformed non-producer mouse and rat cell systems. The hydrazone compounds of the present invention have moreover confirmed their selective toxicity for virus-transformed cells of mouse, rat and human origin when tested for colony-forming ability.

In studies to determine the effect of the compounds in inhibiting focus formation by Moloney sarcoma virus on BALB/3T3 tissue cultures the following procedure is employed. BALB/ 3T3 cell cultures are grown in 250 ml. plastic flasks in growth medium consisting of Eagle's minimal essential medium with 10% fetal bovine serum. Cell counts are made with a Coulter counter after suspending the cells with trypsin-EDTA and diluting in growth medium. Moloney murine sarcoma virus, as a tumor homogenate is employed. It is passaged four times in a Swiss-derived high passage mouse embryo cell line and assayed for focus-forming units in BALB/3T3 cells. In conducting the studies, a modification of the method described by Hartley and Rowe, Proc. Nat. Acad. Sci. 55, 780 (1966) is used. In the present work, flasks are seeded with from $1-2 \times 10^6$ cells in 25 ml. of growth medium and incubated at 37°C. for 24 hours. Following the removal of fluids, virus at a predetermined number of focus forming units is introduced into 0.5 ml. of growth medium and allowed to adsorb on the monolayer of cells for 90 minutes at 37°C. Following this adsorption period, a predetermined quantity, usually as a dose rate of from about 5 to 10 μg/ml. of a hydrazonomethyl rifamycin compound (previously dissolved in DMSO at a concentration of 1 mg/ml) and carried in 25 ml. of growth medium, is added and the cultures returned to the incubator. As a control, DMSO alone in the growth medium is added to a separate culture. After 3 days' incubation, the cultures are fluid-changed and foci of transformed cells counted at day seven.

In the same method, vesicular stomatitis virus, New Jersey serotype, is studied. Methods used to grow and assay this virus have been described by Hackett et al., Virology, 31, 114 (1967).

These properties indicate that these compounds possess an effective inhibitory activity on virus-induced tumors in animals.

DESCRIPTION OF SOME PREFERRED EMBODIMENTS

The following examples describe enabling and best mode embodiments for carrying out the invention.

EXAMPLE 1:

3-(2-Cyclooctylidenehydrazono)methyl-rifamycin SV

A quantity of 1.3 g. of cyclooctanone is dissolved in 10 ml. of tetrahydrofuran and 0.5 g. of 98% hydrazine hydrate is added. The solution is refluxed for one hour and the solvent is evaporated in vacuo to give 0.90 g. of an oily residue which is crude cyclooctylidenehydrazine. This crude product is added to 4.5 g. of 3-formylrifamycin dissolved in 300 ml. of tetrahydrofuran. After 15 minutes, the solution is evaporated to dryness and the solid residue is purified by column chromatography on silica gel, using chloroform then chloroform:methanol mixtures containing up to 1.5% of methanol as eluents. The solid product recovered from the column chromatography is crystallized twice from methanol; yield 1.5 g., m.p. 252°–256°C. with decomposition.

Anal. Calcd. for $C_{46}H_{61}N_3O_{12}$: C, 65.15; H, 7.25; N, 4.95. Found: C, 64.95; H, 7.22; N, 5.10. λ max: 480; 333; 260; shoulder at 505. $E_{1cm.}^{1\%}$: 166; 280; 326.

EXAMPLE 2:

3-(2-Benzylidenehydrazono)methyl-rifamycin SV

To a quantity of 750 mg. of 3-formylrifamycin SV in 10 ml. of tetrahydrofuran, 150 mg. of benzylidenehydrazine is added with stirring at room temperature. The reaction is completed in 20 minutes. The reaction mixture is evaporated to dryness and the crude solid is crystallized from methanol; yield 500 mg; m.p. 203°–214°C. with decomposition.

Anal. Calcd. for $C_{45}H_{53}N_3O_{12}$: C, 65.28; H, 6.45; N, 5.08. Found: C, 64.98; H, 6.69; N, 5.11. λ max: 500; 345; 310. $E_{1cm.}^{1\%}$: 170.9; 346; 341.

EXAMPLE 3:

3-(2-Benzhydrylidenehydrazono)methyl-rifamycin SV

The compound is prepared pursuant to the procedure of Example 2 by mixing 7.5 g. of 3-formylrifamycin SV and 2 g. of benzhydrylidenehydrazine in 100 ml. of tetrahydrofurane. The reaction is completed in one hour; yield 6.1 g., m.p. 260°C. with decomposition.

Anal. Calcd. for $C_{51}H_{57}N_3O_{12}$: C, 67.75; H, 6.35; N, 4.65. Found: C, 66.82; H, 6.39; N, 4.85. λ max: 510; 350. $E_{1cm.}^{1\%}$: 140.1; 278.7.

EXAMPLE 4

3-[2-(p-Carboxybenzylidene)hydrazono]methyl-rifamycin SV

The compound is prepared pursuant to the procedure of Example 3 by substituting an equimolecular amount of (p-carboxybenzylidene)hydrazine in place of benzhydrylidenehydrazine; m.p. 205°–215°C. with decomposition, yield 55%.

Anal. Calcd. for $C_{46}H_{53}N_3O_{14}$: C, 63.36; H, 6:13; N, 4.82. Found: C, 62.04; H, 6.25; N, 5.00.

λ max: 313; 500. $E_{1cm.}^{1\%}$: 402.3; 154.4.

What is claimed is:

1. A 3-hydrazonomethyl-rifamycin designated by the formula

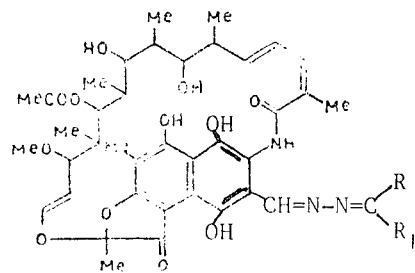

wherein Me represents methyl, R represents hydrogen or phenyl, $R_1$ represents phenyl or carboxyphenyl, and R and $R_1$ taken together with the adjacent carbon atom may represent a 5 to 10 carbon atom cycloalkylidene group; derived from a corresponding cycloalkane and 25-desacetyl and 16, 17; 18, 19; 28, 29-hexahydro derivatives thereof.

2. The compound of claim 1 which is 3-(2-cyclooctylidenehydrazono)methyl-rifamycin SV.

3. The compound of claim 1 which is 3-(2-benzylidenehydrazono)methyl-rifamycin SV.

4. The compound of claim 1 which is 3-(2-benzhydrylidenehydrazono)methyl-rifamycin SV.

5. The compound of claim 1 which is 3-[2-(p-carboxybenzylidene)hydrazono]methyl-rifamycin SV.

* * * * *